PNEUMATIC TIRE AND REMOVABLE TREAD THEREFOR

Original Filed Nov. 26, 1963

INVENTOR

Giuseppe Lugli

BY Stevens, Davis, Miller & Mosher
ATTORNEYS

United States Patent Office

Re. 26,464
Reissued Sept. 24, 1968

26,464

PNEUMATIC TIRE AND REMOVABLE TREAD THEREFOR

Giuseppe Lugli, Milan, Italy, assignor to Pirelli S.p.A., Milan, Italy

Original No. 3,240,249, dated Mar. 15, 1966, Ser. No. 326,169, Nov. 26, 1963. Application for reissue June 5, 1967, Ser. No. 646,761
Claims priority, application Italy, Dec. 5, 1962, 23,928/62
10 Claims. (Cl. 152—176)

Matter enclosed in heavy brackets [ ] appears in the original patent but forms no part of this reissue specification; matter printed in italics indicates the additions made by reissue.

*ABSTRACT OF THE DISCLOSURE*

*A pneumatic tire and tread ring therefor, in which a helically wound metallic cord is disposed in the tread ring along with two layers of metallic cords extending parallel to one another in each layer and disposed along two directions crossed with respect to the mid-circumferential plane of the tire.*

Figure 1:
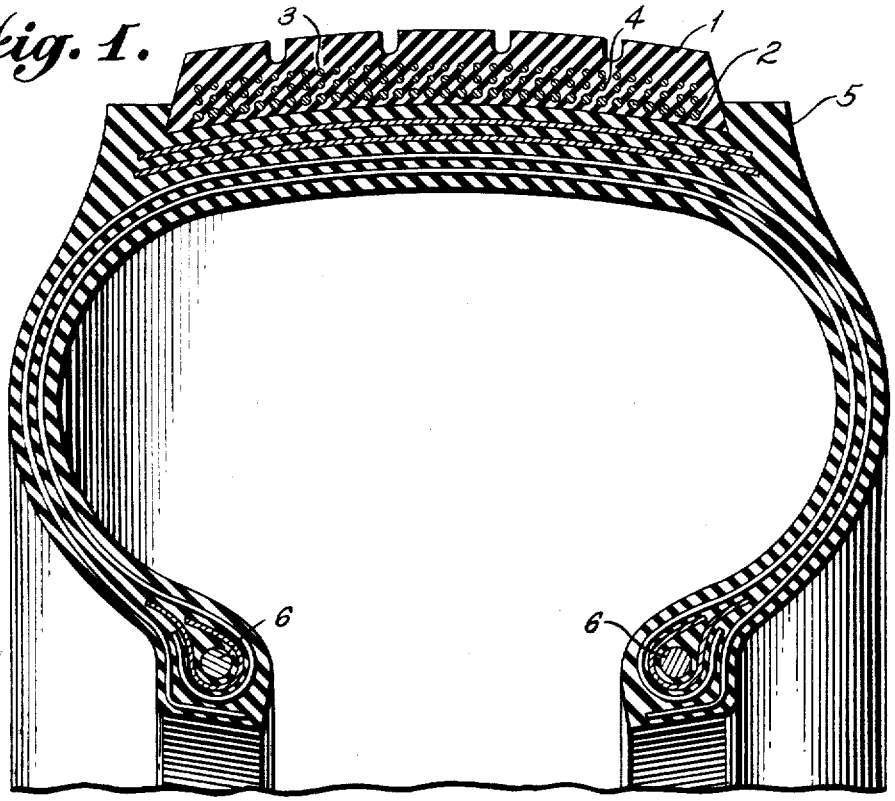

This invention relates to pneumatic tires and particularly to a pneumatic tire having a replaceable tread.

The patent to Lugli, No. 2,874,742, issued February 24, 1959 teaches a pneumatic tire with a removable tread in the form of a ring. The tread ring is provided with an inwardly disposed annular reinforcement in the form of at least one layer of cords, such cords extending in parallel relation to each other and parallel to the mid-circumferential plane of the tire. The tread ring is adapted to be mounted upon a carcass composed of one or more layers of radially disposed cords. The carcass is formed in such a manner that the top portion which is adapted to receive the tread ring has a substantially cylindrical surface. The cords of both the tread and the carcass as disclosed by this patent may be made of a textile or a metallic material.

Further, the patent to Lugli No. 2,985,214, issued May 23, 1961 teaches the provision in a pneumatic tire having a replaceable tread ring of an inner reinforcement for the ring in the form of a single layer of helically wound metallic cord wherein the coils are disposed in a direction substantially parallel to the mid-circumferential plane of the tire. In addition, this patent teaches the provision in the tread ring, radially outwardly of the reinforcement, of at least one layer of metallic cords, parallel to one another in each layer and disposed in a direction substantially transverse with respect to the coils of the helical cords. This outer layer is for the purpose of transversely connecting the coils of the reinforcement to one another to protect against possible tears or punctures of the tread ring.

The primary purpose of the present invention is to provide further improvements in the art with respect to the layers disposed outside the reinforcement of the tread ring for a pneumatic tire having a replaceable tread.

Briefly summarized the present invention comprises a pneumatic tire provided with a tread ring separable from the carcass. The tread ring is provided with a reinforcement having a single layer of helically wound metallic cords in which the coils are disposed in a direction substantially parallel to the mid-circumferential plane. Such tread, in a radially outer position with respect to the reinforcement, is also provided with at least two layers of metallic cords, parallel to one another in each layer and disposed along two directions crossed with respect to the mid-circumferential plane.

It has been found that the two crossed layers disposed outwardly of the reinforcement offer several distinct advantages.

First of all they permit the distribution of the concentrated stresses (resulting from a small obstacle for example) over a broad region of the tread, since each cord belonging to one of the crossed layers and passing through the particular portion concerned with the obstacle cooperates in transmitting the stresses throughout the entire width of the tread and along a length equal to at least the length of the projection of said cord on planes parallel to the mid-circumferential plane.

Further, the two crossed layers provide protection against punctures and ruptures due to impacts which is far more efficient than that afforded by two layers wherein the cords are disposed transversely.

Figure 2:
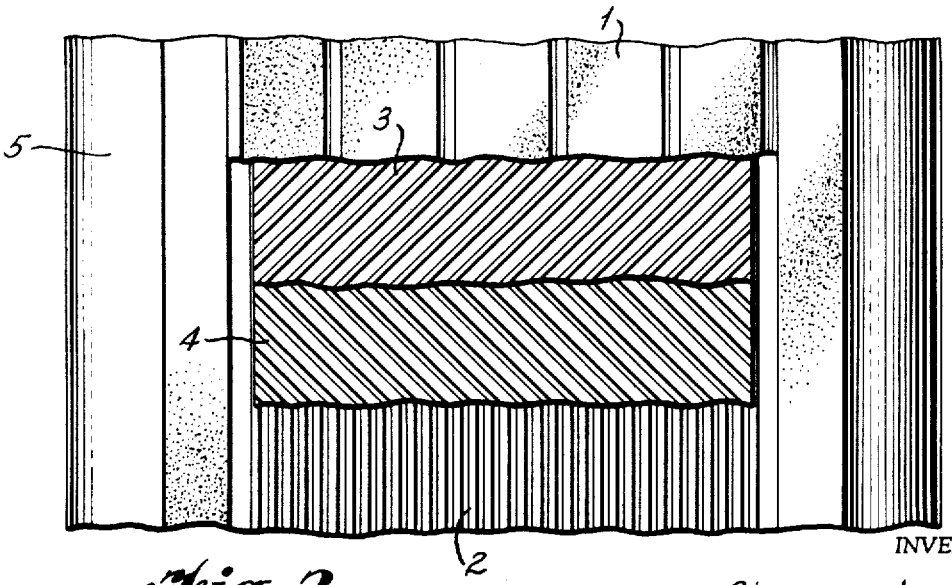

The invention will now be further described with reference to the accompanying drawings, which illustrate an embodiment of the invention presently believed to be the best means for carrying out the invention, and wherein:

FIG. 1 is a cross sectional view of a pneumatic tire in accordance with the present invention; and FIG. 2 is a plan view of the pneumatic tire shown in FIG. 1, with portions removed to illustrate the disposition of the cords within the tread.

An embodiment of the invention as shown by FIG. 1 comprises a pneumatic tire of the removable tread type consisting of a tread ring 1 and a carcass 5 adapted to carry the tread ring. An annular reinforcement 2 is disposed within the tread ring 1, in the form of a layer of helically wound metallic cord, the coils of which are disposed in a direction substantially parallel to the mid-circumferential plane of the tire assembly. In a radially outer position with respect to the reinforcement 2, there are two annular layers 3 and 4 also of metallic cords, parallel to one another in each layer, and disposed along two directions crossed with respect to the mid-circumferential plane of the tire.

It is advisable for the angle formed by the cords of the outer layers with the mid-circumferential plane to be not too great (not over 65°), since otherwise the length of tread concerned by a single cord would be excessively limited and consequently the first of the two advantages would be considerably reduced. On the other hand, it is also advisable for the angle in question not to be too small, because to provide adequate resistance against ruptures due to impacts, the outer layers must not be subjected to tension and this is obtained by disposing the cords at an angle greater than 25°. In this way the modulus of elasticity of the reinforcement is much higher than that of the structure constituted by the outer layers and consequently in the practice, the latter is completely released by tension stresses.

Therefore it is advisable that the angle formed by the cords of the outer layers with the mid-circumferential plane be comprised between 25° and 65°. According to a particularly preferred embodiment of the invention, it can range between 30° and 50°.

As the cords of the outer layers are not subjected to tension stresses, they may be much thinner than the cords of the reinforcement, and accordingly are far more flexible than the latter.

For instance the diameter of the cords of the outer layers may be of the order of ⅓ that of the cords of the reinforcement. In such case the tread ring for a pneumatic tire of the size 9.00–20 can be provided with reinforcing cords having a diameter of 2.7 mm., while the cords of the outer layers have a diameter of 0.9 mm.

The tread ring 1 is assembled on a casing 5 provided with bead cores 6 and with a carcass 7 composed of cords lying in radial planes or in planes forming small angles with said radial planes. The carcass may be provided with annular breaker strips 8 and 9.

The angular disposition of the cords of the reinforcement and of the outer layers is best shown in FIG. 2. The cords of the reinforcement 2 are substantially parallel to the mid-circumferential plane, while the cords of the outer layers 3 and 4 form symmetrical angles of 45° relative to the mid-circumferential plane.

It should be understood that the present invention includes any other alternative form of realization falling within the scope of the appended claims.

What is claimed is:

1. A pneumatic tire having a separable tread ring and a carrying carcass to receive said tread ring, said tread ring being provided with a reinforcement in the form of a layer of helically wound metallic cord, in which the coils are disposed in a direction substantially parallel to the mid-circumferential plane, characterized in that said tread ring, in a radially outer position with respect to the reinforcement, contains at least two layers of metallic cords parallel to one another in each layer and disposed along two directions crossed with respect to the mid-circumferential plane.

2. A pneumatic tire as in claim 1, characterized in that the angle formed by the cords of the outer layers with the mid-circumferential plane of the tire ranges between 25° and 65°.

3. A pneumatic tire as in claim 2, characterized in that said angle is between 30° and 50°.

4. A pneumatic tire as in claim 1, characterized in that the cords of the outer layers have a diameter substantially less than that of the cords of the reinforcement.

5. A pneumatic tire as in claim 4, wherein the cords of said outer layers are of a diameter approximately one-third the diameter of the cords of said reinforcement.

*6. A tread ring adapted to be detachably mounted on a carrying carcass to form a pneumatic tire, said tread ring being provided with a reinforcement in the form of a layer of helically wound metallic cord, in which the coils are disposed in a direction substantially parallel to the mid-circumferential plane, characterized in that said tread ring, in a radially outer position with respect to the reinforcement, contains at least two layers of metallic cords parallel to one another in each layer and disposed along two directions crossed with respect to the mid-circumferential plane.*

*7. A tread ring as in claim 6, characterized in that the angle formed by the cords of the outer layers with the mid-circumferential plane of the tire ranges between 25° and 65°.*

*8. A tread ring as in claim 7, characterized in that said angle is between 30° and 50°.*

*9. A tread ring as in claim 6, characterized in that the cords of the outer layers have a diameter substantially less than that of the cords of the reinforcement.*

*10. A tread ring as in claim 9, wherein the cords of said layers are of a diameter approximately one-third the diameter of the cords of said reinforcement.*

References Cited

The following references, cited by the Examiner, are of record in the patented file of this patent or the original patent.

UNITED STATES PATENTS

| | | | |
|---|---|---|---|
| 2,317,912 | 4/1943 | Howe | 152—356 |
| 2,985,214 | 5/1961 | Lugli | 152—176 |
| 3,095,026 | 6/1963 | Weber | 152—355 |

FOREIGN PATENTS

| | | |
|---|---|---|
| 1,266,443 | 9/1960 | France. |

ARTHUR L. LA POINT, *Primary Examiner.*

C. B. LYON, *Assistant Examiner.*